United States Patent [19]

Mashimo et al.

[11] Patent Number: 4,765,930
[45] Date of Patent: Aug. 23, 1988

[54] PRESSURE-RESPONSIVE VARIABLE ELECTRICAL RESISTIVE RUBBER MATERIAL

[75] Inventors: Satoshi Mashimo, Akashi; Susumu Nagayasu, Kobe; Yoshio Yamaguchi, Kobe; Toru Noguchi, Kobe; Masayoshi Nakajima, Ashiya; Hajime Kakiuchi, Itami; Kijuro Tanida, Ashiya, all of Japan

[73] Assignee: Mitsuboshi Belting Ltd., Kobe, Japan

[21] Appl. No.: 882,083

[22] Filed: Jul. 3, 1986

[30] Foreign Application Priority Data

Jul. 3, 1985 [JP] Japan ............................ 60-147160
Sep. 13, 1985 [JP] Japan ............................ 60-204020
Nov. 13, 1985 [JP] Japan ............................ 60-255652

[51] Int. Cl.$^4$ ............................................. H01B 1/06
[52] U.S. Cl. ............................ 252/511; 252/502; 252/503; 252/504; 252/506; 252/507; 252/508; 252/509; 524/495; 524/496; 524/440; 524/451; 524/445; 524/413; 524/401; 524/425; 524/430; 524/493
[58] Field of Search ............... 252/511, 502, 509, 512, 252/518, 516, 503, 504, 506, 508, 513, 507, 520; 524/495, 496, 440, 401, 451, 445, 413, 425, 430, 493, 500

[56] References Cited

U.S. PATENT DOCUMENTS

| | | | |
|---|---|---|---|
| 3,875,434 | 4/1975 | Harden et al. | 338/114 |
| 4,145,317 | 3/1979 | Sado et al. | 252/512 |
| 4,292,261 | 9/1981 | Kotani et al. | 252/511 |
| 4,302,361 | 11/1981 | Kotani et al. | 252/511 |
| 4,495,236 | 1/1985 | Obara et al. | 428/172 |

FOREIGN PATENT DOCUMENTS 2752540 1/1978 Fed. Rep. of Germany .
52-139989 11/1977 Japan .

OTHER PUBLICATIONS

Abstract—Japanese Patents Gazette, vol. 80, No. 24, Jul. 11, 1980, section CH-A85, ref. No. 80-42 324C/24 JP-A-55 58 504.
Chemical Abstracts, vol. 88, No. 20, May 15, 1978, p. 603 ref. No. 145162f; Columbus, Ohio—JP-A-52 139 989 (Inoue—Japan).

Primary Examiner—Josephine Barr
Attorney, Agent, or Firm—Wood, Dalton, Phillips, Mason & Rowe

[57] ABSTRACT

A pressure-responsive variable electrical resistive rubber material including at least one inorganic filler selected from a group consisting of conductive carbon black, short fibers of nonmetallic inorganic material, powder, and whiskers. The filler is dispersed in a matrix formed of an electrically insulative rubber. The rubber material exhibits a gradually reducing resistance value as a gradually increased pressing force is applied thereto. The rubber material provides a wide range of relationship between the applied force and the electrical resistance thereof. The rubber material is adapted for use as a pressure sensor having excellent fatigue creep resistance.

9 Claims, 4 Drawing Sheets

PRESSURE-RESPONSIVE VARIABLE ELECTRICAL RESISTIVE RUBBER MATERIAL

BACKGROUND OF THE INVENTION

This invention relates to a pressure-sensitive conductive rubber material and, more particularly, to such rubber material having an excellent maintained elasticity. The material includes an inorganic filler in a rubber matrix and exhibits a decrease in the electrical resistance thereof when pressurized from a nonpressurized state. The resistance value varies sensitively with changes in the pressurizing force.

It is known, for example in Japanese Patent Laid-open Nos. 58504/1980, 147547/1980 and 5840/1981 official gazettes, and U.S. Pat. Nos. 2,951,817 and 3,758,213, that electrically insulative rubber containing carbon black or metallic particles reacts to deformation under pressure to provide a variable electric resistance.

It is also known, for example in Japanese Patent Laid-open No. 152033/1983 official gazette, that a dispersion of conductive magnetic metallic particles in an elastic electrically insulating polymer may be molded while applying a magnetic field in a predetermined direction, before or during the crosslinking to produce a pressure-sensitive conductive rubber in which the metallic particles are arranged along the magnetic field in a predetermined direction.

When a pressure-sensitive conductive rubber sheet of this type is distorted by a pressing force, there is a substantial probability of the conductive particles contacting each other and thereby reduce the resistance value of the material.

Another form of pressure sensitive sheet material comprises a rubber sheet having a cellular structure on the surface of the sheet. A conductive material, such as metallic powder, is provided therein to improve the sensitivity of the rubber sheet. Such a sheet is disclosed, for example, in Japanese Patent Laid-open No. 20981/1983 official gazette.

Various conductive rubber sheets in which metallic fibers are provided extending in the thicknesswise direction of the sheet (e.g., Japanese Patent Laid-open No. 220307/1983 official gazette) are also known. When such a conductive rubber sheet is pressed by electrode plates at opposite sides of the sheet, the surface of the rubber sheet contacting the electrode plates gradually increases with the result that its resistance value decreases.

However, the known pressure-sensitive conductive rubber materials have a serious disadvantage in that the probability of contact between the conductive particles varies with the temperature of the matrix. Further, the conductive particles may separate due to the compressive deformation of the rubber sheet thereby making it difficult to obtain a stable resistance value.

When such known conductive rubber material is subjected to large strains repeatedly for a long period of time, the surface portion hardens from fatigue and the rubber loses creeping resistance. As a result, the electrode plates contact the conductive materials in the surface portion and the electric resistance value prior to force being applied to the plate contacting the surface is decreased so that the desired variation in the electric resistance value proportional to the pressurizing face is not attained. It is therefore impossible to maintain desirable pressure-sensitive performance over a long period of time.

In addition, even though the resistance value of the known pressure-sensitive conductive rubber decrease proportional to the increase in pressing force, when the pressuring force arrives at a predetermined value, the resistance value decreases rapidly resulting in poor pressure sensitive performance.

The relationship between the pressing force and the resistance value of known pressure-sensitive conductive rubber is not a predetermined property thereof. Since the variation of the resistance value in a given range of the pressing force is small resulting in poor pressure-sensitive performance, these known rubbers cannot be used in applications as pressure-sensitive sensors.

Further, other known conductive rubber sheets have complicated surface structures which cause metallic particles or fiber therein to sink from the surface of the rubber matrix causing recesses on the surface. In the absence of a pressing force, the rubber sheets may inhibit current flow since the metallic filler does not directly contact the electrode plates. The electrode plates will, however, contact the metallic filler due to the deformation of the rubber matrix when the rubber sheet is subject to a pressurizing force which reduces its electric resistance value. However, in the latter instance, the resistance value does not vary until the rubber matrix is deformed sufficiently so that the electrode plates are in contact with the metallic fillers. Additionally, the resistance of these known rubber sheet has a tendency to abruptly decrease even with only a small change in pressurizing force due to small foreign materials such as dust being interposed within fine recesses on the surface of the rubber matrix, thereby reducing the electric resistance value when subject to the pressurizing force, causing the sensitivity to be decreased.

SUMMARY OF THE INVENTION

Accordingly, a primary object of this invention is to provide a pressure-sensitive conductive rubber material which eliminates the disadvantages of known conductive rubber materials as described above, which improves the properties of the rubber material, including an insulating rubber matrix, in which a conductive member is dispersed to gradually reduce its resistance value as a pressing force increases, which provides a useful relationship between the pressing force and the resistance value over a large range of resistance values, and which is useful as a pressure sensor having excellent fatigue creeping resistances.

Another object of this invention is to provide a pressure-sensitive conductive rubber material which may function in an ON-OFF manner by abruptly reducing its resistance value at a predetermined pressing force.

According to one feature of this invention, there is provided a pressure-sensitive conductive rubber material in which an inorganic filler of at least one type selected from a conductive carbon black, a short fiber made of inorganic nonmetallic material, powder or whisker is dispersed in an electrically insulating rubber matrix to form a composite material and part of the inorganic filler is exposed on the surface of the rubber matrix on the surface of the composite material.

According to another feature of this invention, there is provided a pressure-sensitive conductive rubber material in which an inorganic filler of at least one type selected from a conductive carbon black, a short fiber made of inorganic nonmetallic material, powder or whisker is uniformly dispersed in an electrically insulating rubber matrix to form a sheet-shaped composite material and to disperse electrically insulating powder on at least one surface of the composite material.

According to still another feature of this invention, there is provided a pressure-sensitive conductive rubber material in which an inorganic filler or whisker is dispersed in an electrically insulating rubber matrix to form a composition.

The above and other objects and features of the invention will be apparent from a reading of the following description of the disclosure found in the accompanying drawings and the novelty thereof pointed out in the appended claims.

DESCRIPTION OF THE PREFERRED EMBODIMENTS

Figure 1:
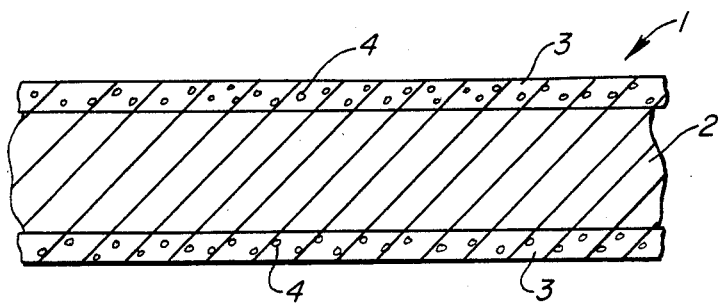
FIG. 1 is a longitudinal sectional view of an embodiment of a pressure-sensitive conductive rubber sheet according to the present invention.

This invention will be described in detail with respect to the accompanying drawings.

According to the invention, an electrically insulating rubber may be, for example, natural rubber, polybutadiene rubber, polyisoprene rubber, styrene-butadiene copolymer rubber, nitrile rubber, butyl rubber, chloroprene rubber, acrylonitrile-butadiene copolymer rubber, ethylene-propylene copolymer rubber or silicone rubber. The rubber may contain two or more of the above rubber types. The rubber may use crosslinking rubber of sulfur, sulfide or peroxide so as to improve the mechanical strength and head resistance, and may be used after crosslinking.

Conductive carbon black used in this invention may be, for example, furnace blacks acetylene blacks, thermal blacks, or channel blacks ordinarily used and known per se. The amount of the carbon black used is 2.0 to 100 parts by weight with respect to 100 parts by weight of the rubber. A preferable range is 10 to 80 parts by weight of carbon black. A most preferable range is 30 to 70 parts by weight of carbon black.

If the content of the carbon black is less than 2 parts by weight, the resistance value of the rubber material is always high and the rubber material does not adequately function as a pressure-sensitive conductive rubber. Conversely, if the content exceeds 100 parts by weight, the rubber is hardened to a point which reduces the variation in the resistance value caused by a pressing force.

If the carbon black content is 30 to 70 parts by weight, the resistance value gradually varies as the pressing force varies over a large varying range of the resistance value.

An inorganic filler used in the invention may be, for example, short fiber of nonmetallic inorganic material, powder or whisker. The short fiber may be, for example, ceramics of silicon carbide (SiC), glass, silicon nitride ($Si_3N_4$) 100 micron to 100 mm in length and 3 to 30 micron in diameter. Powders, called "ceramic powder" being 0.05 to 100 micron in diameter, may be, for example, carbides such as silicon carbide (SiC), titanium carbide (TiC), boron carbide ($B_4C$), or tungsten carbide (WC), nitrides such as silicon nitride ($Si_9N_4$), aluminum nitride (AlN), boron nitride (BN) or titanium nitride (TiC) and oxides such as alumina ($Al_2O_3$), zirconia ($ZrO_2$) or beryllia (BeO), and most preferably silicon carbide or silicon nitride.

Further, the whisker may be, for example, alpha-silicon carbide (alpha-SiC), beta-silicon carbide (beta-SiC), silicon nitride ($Si_9N_4$), alpha-alumina ($Al_2O_3$), titanium oxide, zinc oxide, tin oxide, graphite, Fe, Cu, or Ni, and has an acicular crystal having a size 0.05 to 3 micron in diameter and 5 to 500 micron in length. When the inorganic filler is added to the rubber, the rubber is treated with a silane coupling agent or a titanium coupling agent. Alternately, when the filler is mixed with the rubber, the silane coupling agent or titanium coupling agent may be added. Thus, reinforcing effect of the rubber is enhanced to improve the dispersion of the filler into the rubber.

The amount of the inorganic filler is 1 to 80 parts by weight and preferably 5 to 40 parts by weight with respect to 100 parts by weight of the rubber. If the amount of the filler is less than 1 part by weight, the exposing effect of the filler on the surface of the rubber sheet decreases to reduce the resistance value when the rubber is not subject to a pressurizing force, and the electric resistance value is high with a low pressurizing force of 0.5 kg/cm$^2$ so that the resistance value varies significantly with respect to slight pressure changes. If the amount of the filler exceeds 80 parts by weight, the resistance varies little with pressure changes due to the hardening of the rubber.

A method used to mix the respective ingredients or components is not limited, and includes kneading and pressurizing by a suitable known means or process using, for example, a Banbary mixer, a kneader or rolls.

According to the invention, a softening agent, an age preventing agent, a processing aid, a vulcanization accelerator, and/or crosslinking agent ordinarily used for rubber may be added as would be obvious to one skilled in the art.

The pressure-sensitive conductive rubber sheet thus obtained is a composite material in which the abovementioned inorganic filler is dispersed in the rubber matrix, and is partly exposed on the surface of the composite material. Thus, the resistance value of the pressure-sensitive conductive rubber sheet depends on the extent to which the filler exposed on the surface contacts with the electrode plates. With no pressure applied, the resistance value may be so high as to be effectly in an insulating state with no conducting path being formed.

As the inorganic filler exposed on the surface is pressed on the rubber matrix with relatively low pressing forces, it gradually contacts the electrode plates with the pressure-sensitive conductive rubber described above and simultaneously applies a local distortion to the rubber matrix, carbon black, and the inorganic filler. The carbon black and the inorganic fillers approach each other to readily form a link, and the resistance value starts gradually decreasing. Further, if the pressing force increases, the entire rubber matrix uniformly deforms. Thus, the conductive members contact therebetween to increase the probability of forming the link, thereby improving the conductivity.

Since the whisker of inorganic filler used in the invention has an acicular crystal and very rigid property, the whisker is dispersed and exposed on the rubber matrix in several directional angles due to its specific properties. The whisker dispersed in the rubber matrix feasibly approaches the carbon black and the exposed whisker when force is applied to readily form a link, and its resistance sensitively varies by the small pressing force. Further, since the whisker is acicular with a very large aspect ratio, while the carbon black is substantially granular, the conductive members of both are dispersed in entirely different states. Thus, it is presumed that different members such as the acicular member and the granular member, or the acicular member and the acicular member can readily approach each other as compared with the manner that the granular members approach each other when force is applied.

The whisker is buried in the rubber matrix on the surface of the composite material. However, the whisker may be partly exposed in such a manner that the projecting amount is 0.05 to 500 micron and more preferably 0.1 to 200 micron.

In the invention, powder or short fiber of the same material as the whisker may be used in addition to the whisker as described above. In this case, when the powder or the short fiber is dispersed near in the surface of the unvulcanized sheet extruded from rolls and vulcanized so as to be exposed on the surface of the rubber matrix like the whisker, the short fiber or the powder is partly exposed on the surface of the rubber matrix.

On the other hand, in the pressure-sensitive conductive rubber material of the invention, when the powder having electric insulation is buried in the surface layer, a rubber material having good creep and fatigue resistances with good pressure sensitive performance together with the above characteristics can be provided.

Figure 2:
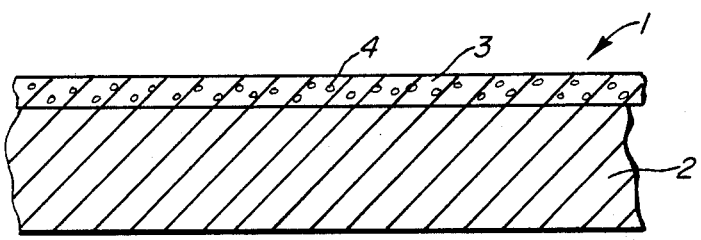
FIG. 2 is a longitudinal sectional view of an alternate embodiment of a pressure-sensitive conductive rubber sheet according to the present invention.

More particularly, FIG. 1 shows a longitudinal sectional view of an embodiment of a pressure-sensitive conductive rubber sheet according to this invention. FIG. 2 shows a longitudinal sectional view of another embodiment of a pressure-sensitive conductive rubber sheet according to this invention. A pressure-sensitive conductive rubber sheet 1 is formed of a composite material 2 mixed with at least one type selected from conductive carbon black, short fiber made of nonmetallic inorganic material, powder and whisker in an electrically insulating rubber matrix. An electrically insulating powder 4 is buried in the composite material 2 on both side surface layers 3 of the rubber sheet 2.

Alternately, the rubber sheet 1 shown in FIG. 2 contains powder 4 buried in only one surface layer 3 of a composite material 2.

The thickness of the surface layer 3 shown in FIGS. 1 and 2 is preferably 0.1 to 20% of the entire thickness of the composite material 2.

The electrically insulating powder 4 used in the invention may be, for example, inorganic materials such as glass, calcium carbonate, clay, talc or organic materials such as phenyl resin, epoxy resin, urea resin or ebonite. The powder 4 may be of shapes such as powder, granular or short length rod shape, being 0.1 to 100 micron in diameter. The amount of the powder 4 is 0.05 to 5% by weight. If less than 0.05% by weight is used, the results of this invention cannot be obtained, while if the powder exceeds 5% by weight, the hardness of the surface layer increases. Thus, since the surface layer 3 of the rubber sheet 1 is mixed and dispersed with the electrically insulating powder 4, no link is formed between the composite material 2 and the electrode plates contacting with the surface layer when no force is present. When force is applied, the possibility of contacting the conductive member dispersed in the surface layer 3 and the inner layer to form a conductive link increases.

Further, when the powder 4 is buried in the surface layer 3 of the sheet 1, frictional coefficient decreases with the reduction of the adhesiveness of the surface, and the electrode plate can be readily separated from the surface of the rubber sheet 1.

Thus, it is apparent that the pressure-sensitive conductive rubber sheet of the present invention shows less variation in the varying range of electrical resistance over periods of time due to the further mechanical reinforcement provided by the powder 4, and also less fatigue decreases commonly caused by repeated pressing.

The rubber sheet 1 is produced by adding conductive carbon black and inorganic filler to electrically insulating rubber and, as required, softening agent, age preventing agent, vulcanizing agent, and/or crosslinking agent used ordinarily in rubber, forming a sheet-shaped material from a kneaded mixture of the above ingredients by, for example, a Banbary mixer, or kneader rolls, wiping the electrically insulating powder 4 on the surface of the sheet-shaped rubber material, then vulcanizing it, or alternately, forming in advance a sheet-shaped surface layer 3 mixed with the electrically insulating powder 4, laminating it on the sheet-shaped material and then vulcanizing it.

When the whisker is used as the inorganic filler in the pressure-sensitive conductive rubber material of the invention, the desirable properties described in paragraphs (1) to (3), below, can be obtained.

(1) The resistance value of the pressure-sensitive conductive rubber material of the present invention, when certain amounts of conductive materials such as conductive carbon black and whisker are used, gradually varies as pressing force increases, thereby providing a pressure-sensitive conductive rubber material having a large resistance varying range. In this case, the amount of the conductive carbon black is 30 to 70 parts by weight and preferably 40 to 60 parts by weight with respect to 100 parts by weight of the rubber. If less than 30 parts by weight of carbon black is used, its resistance value does not adequately decrease as the pressing force increases even if the predetermined amount of whisker is added. If more than 70 parts by weight of carbon black is used, the resistance value abruptly decreases as the pressing force increases, and at a predetermined force, the remaining resistance varying range becomes so small that the pressure sensing performance is inadequate.

The amount of the whisker added should be 10 to 60 parts by weight and preferably 10 to 40 parts by weight with respect to 100 parts by weight of the rubber. If less than 10 parts by weight is used, the relationship between the pressing force (log P) and the resistance value (log R) becomes a curve being convex in the upward direction. Subsequently, when the force is repeatedly applied, the irregularity of the resistance value increases, and its creep resistance decreases. On the other hand, if the whisker exceeds 60 parts by weight, its resistance increases, and the effect of adding the whisker is eliminated. When the amount of the whisker is 10 to 40 parts by weight, the relationship between the pressing force (log P) and the resistance value (log R) becomes linear.

The total amount of the above conductive members such as carbon black and the whisker is 40 to 90 parts by weight and preferably 50 to 80 parts by weight with respect to 100 parts by weight of the electrically insulating rubber. If less than 40 parts by weight are added, the resistance value does not adequately vary due to the variation in the pressing force, causing the rubber to provide inadequate pressure sensitive conductivity. On the other hand, if more than 90 parts by weight are used, the conductivity increases and the variation in the resistance value with respect to the variation in the pressing force is small, and the pressure sensitivity decreases.

The pressure-sensitive conductive rubber material described above gradually varies its resistance value as the pressing force increases by mixing and dispersing the carbon black and the whisker in limited amounts, and increases the variation range of the resistance value. Thus, when the pressing force is repeatedly applied, only a small variation in the resistance value is evident, and further the rubber material also has a property of varying the voltage by the amount of compressing deformation.

(2) According to the present invention, if the thickness of the pressure sensitive conductive rubber material having only the whisker dispersed and mixed as the conductive member in the electrically insulating rubber is less than approximately 200 micron, the rubber material functions in an ON-OFF manner. The rubber material abruptly decreases in resistance value if the pressing force of a predetermined value is applied. In this case, the amount of the whisker is 2 to 400 parts by weight and preferably 5 to 200 parts by weight with respect to 100 parts by weight of the rubber. If the amount of the whisker is less than 2 parts by weight, the pressure sensitive conductivity decreases, while if more than 400 parts by weight of whisker is used, mixture and dispersion of the whisker into the rubber becomes difficult preventing the rubber from performing the objects of this invention.

Since the whisker used in this invention has acicular crystals, it is exposed on the surface of the sheet-shaped composite material while the whisker is uniformly dispersed in the sheet. Thus, when the composite material is pressed by both electrode plates, the possibility of contacting the whisker projected from the surface of the sheet and the whisker dispersed in the interior increases to perform the pressure-sensitive conductivity.

However, if the thickness of the sheet-shaped composite material of this invention exceeds 200 micron, even if the material is pressed, it acts in an insulating state, and it does not exhibit pressure-conductive conductivity. Thus, the thickness of the composite material is necessarily limited to 200 micron or less and preferably 20 to 60 micron.

(3) The rubber material in which only the whisker is dispersed and mixed as the conductive member becomes pressure-sensitive conductive for sensitively detecting the variation in a resistance value or an electric capacity with respect to the variation in the pressurization. The thickness of the pressure-sensitive conductive rubber material is not limited.

Examples of the pressure-sensitive conductive rubber material of this invention will be described. However, this invention is not limited to the particular Examples described herein.

EXAMPLE 1

After the rubber mixtures based on Table 1 were kneaded by a Banbary mixer, the mixtures were extruded by rolls into 2 mm thick sheets. The sheets were sequentially engaged in a mold, and vulcanized at 150° for 20 minutes. The vulcanized sheets were cut to 30×33 mm as test pieces, and electric resistance values of the test pieces were measured in both nonpressurized and pressurized states. Several seconds after a load of 0.5 kg/cm$^2$ was mounted on the test piece, the load was removed. This operation was repeated ten times, and the electric resistance values of the test pieces were measured in both the nonpressurized state and with a force of 0.5 kg/cm$^2$. The resistance value retentivity (%) of the test pieces after ten operations were determined by dividing the resistance value in the pressurized and in the that at nonpressurized states. The results are indicated on Table 1.

The electric resistance value was determined by first holding the test piece between Teflon plates of approx. 200 g., mounting a copper plate of approx. 0.3 mm of thickness between the test piece and the Teflon plate at that time, and obtaining the resistance value by a digital multimeter with a pair of copper plates as electrode plates. The pressing was applied by mounting a weight on the Teflon plate.

As indicated in Table 1, the pressure-sensitive conductive rubber sheet mixed with the carbon black and the whisker exhibits a trend that the resistance value decreases sensitively as the load increases as compared with the rubber sheet mixed only with the carbon black as the conductive member, and the resistance value retentivity increases, and the resistance value decreases significantly.

TABLE 1

(Unit: parts by weight)

| | Example | | | | Comparison example | | | | |
|---|---|---|---|---|---|---|---|---|---|
| | 1 | 2 | 3 | 4 | 1 | 2 | 3 | 4 | 5 |
| Chloroprene rubber | 100 | 100 | 100 | 100 | 100 | 100 | 100 | 100 | 100 |
| Stearic acid | 2 | 2 | 2 | 2 | 2 | 2 | 2 | 2 | 2 |
| Magnesium oxide | 5 | 5 | 5 | 5 | 5 | 5 | 5 | 5 | 5 |
| Age preventing agent | 1 | 1 | 1 | 1 | 1 | 1 | 1 | 1 | 1 |
| Process oil | 4 | 4 | 4 | 4 | 4 | 4 | 4 | 4 | 4 |
| $Z_nO$ | 5 | 5 | 5 | 5 | 5 | 5 | 5 | 5 | 5 |
| Ethylene thiourea | 0.5 | 0.5 | 0.5 | 0.5 | 0.5 | 0.5 | 0.5 | 0.5 | 0.5 |
| Carbon black *1 | 36 | 36 | 36 | 36 | 0 | 18 | 36 | 54 | — |
| Carbon black *2 | | | | | | | 0 | 0 | 36 |
| Whisker *3 | 3.6 | 9.2 | 19 | 40 | 0 | 0 | 0 | 0 | 0 |
| Initial electric resistance value (ohm) | | | | | | | | | |
| No load | 1.2M | 880k | 1.1M | 1.7M | 1400M | 1.2M | 640K | 37K | 17K |
| 0.5 kg/cm² | 8k | 9k | 9k | 14k | 640k | 64k | 11k | 7k | 4k |
| 1.0 | 4.5k | 4k | 4k | 11k | 610k | 35k | 7k | 140k | 460 |
| 1.5 | 3k | 3k | 3k | 10k | — | 19k | 4 | 90 | 270 |
| Repetition (ohm) | | | | | | | | | |
| 0 | 1.2M | 600k | 900k | 140k | 1400M | 1M | 500k | 20k | 4k |
| 0.5 kg/cm² | 10k | 10k | 8k | 18k | 600M | 200k | 50k | 1k | 800 |
| Resistance value retentivity (%) | 0.9 | 1.7 | 0.9 | 13 | 42.9 | 20 | 10 | 5 | 20 |

*1: Seest 116 (Furnace type)
*2: N220 (Furnace type)
*3: SiC

EXAMPLE 2

SiC, $Si_3N_4$, or BN were alternately used as ceramic powder of the inorganic filler and SiC or glass fiber were alternately used as glass or short fiber. The mixtures and the results are listed in Table 2. The variations in the electric resistance values at no load time and after pressing forces were applied are less desirable when as compared with that obtained when using the whisker.

TABLE 2

(Unit: parts by weight)

| | Example | | | | | |
|---|---|---|---|---|---|---|
| | 2-1 | 2-2 | 2-3 | 2-4 | 2-5 | 2-6 |
| Chloroprene rubber | 100 | 100 | 100 | 100 | 100 | 100 |
| Stearic acid | 2 | 2 | 2 | 2 | 2 | 2 |
| Magnesium oxide | 5 | 5 | 5 | 5 | 5 | 5 |
| Age preventing agent | 1 | 1 | 1 | 1 | 1 | 1 |
| Process oil | 4 | 4 | 4 | 4 | 4 | 4 |
| $Z_nO$ | 5 | 5 | 5 | 5 | 5 | 5 |
| Ethylene thiourea | 0.5 | 0.5 | 0.5 | 0.5 | 0.5 | 0.5 |
| Carbon black *1 | 36 | 36 | 36 | 36 | 36 | 36 |
| Powder SiC | 32 | | | | | |
| Powder $Si_3N_4$ | | 40 | | | | |
| Powder Bn | | | 28.5 | | | |
| Powder glass | | | | 32 | | |
| Short fiber SiC | | | | | 32 | |
| Short fiber glass | | | | | | 32 |
| Initial electric resistance value (ohm) | | | | | | |
| No load | 8M | 1.8M | 5M | 1.8M | 3M | 12M |
| 0.5 kg/cm² | 190k | 60k | 240k | 130k | 30k | 36k |
| 1.0 | 160k | 45k | 180k | 48k | 12k | 20k |
| 1.5 | 160k | 30k | 130k | 25k | 5k | 10k |
| Repetition (ohm) | | | | | | |
| 0 | 5M | 5M | 5M | 1.5M | 3M | 12M |
| 0.5 kg/cm² | 200k | 100k | 300k | 90k | 30M | 120k |
| Resistance value retentivity (%) | 4 | 2 | 6 | 6 | 1 | 1 |

EXAMPLE 3

Rubber sheets were made having acetylene black as carbon black, chloroprene rubber, nitrile rubber (NBR), or a blend of natural rubber (NR) and butyl rubber (BR) as electrically insulating rubber. The mixture and the results of the electric resistance values are listed in Table 3.

Since the acetylene black was mixed, the resistance value at no load time was small and the resistance value retentivity after pressurizing was small. The acetylene black is very effective and the blend of the natural rubber and the butyl rubber as the rubber exhibits good result.

The electric resistance value is low with good conductivity at no load time with only the acetylene black used. However, the resistance value retentivity of 20% is high and thus the desirable pressure-sensitive conductive rubber sheet cannot be obtained.

TABLE 3

(Unit: parts by weight)

| | Example | | | | | | | C. Example | |
|---|---|---|---|---|---|---|---|---|---|
| | 3-1 | 3-2 | 3-3 | 3-4 | 3-5 | 3-6 | 3-7 | 3-8 | 3-9 |
| CR | 100 | 100 | | | | | | | |
| NBR | | | 100 | 100 | | | | | |
| NR/BR *3 | | | | | 100 | 100 | 100 | 100 | 100 |
| $Z_nO$ | 5 | 5 | 5 | 5 | 4 | 4 | 4 | 4 | 4 |
| Stearic acid | 2 | 2 | 0.5 | 0.5 | 1 | 1 | 1 | 1 | 1 |
| Process oil | 4 | 4 | 4 | 4 | 4 | 4 | 4 | 4 | 4 |
| Accelerator CM | 0.5 | 0.5 | 1 | 1 | 1 | 1 | 1 | 1 | 1 |
| Sulfur | 0 | 0 | 2 | 2 | 1 | 1 | 1 | 1 | 1 |

TABLE 3-continued (Unit: parts by weight)

| | Example | | | | | | | C. Example | |
|---|---|---|---|---|---|---|---|---|---|
| | 3-1 | 3-2 | 3-3 | 3-4 | 3-5 | 3-6 | 3-7 | 3-8 | 3-9 |
| Acetylene black | 54 | 54 | 54 | 54 | 54 | 54 | 54 | 54 | 50 |
| Powder SiC | 5 | | 5 | | 5 | | 40 | | 0 |
| Whisker SiC | | 5 | | 5 | | 5 | | 40 | 0 |
| Repetition (ohm) | | | | | | | | | |
| 0 | 3.5M | 8k | 25k | 50k | 15k | 20k | 35k | 15k | 250 |
| 0.5 kg/cm$^2$ | 200k | 200 | 500 | 300 | 80 | 60 | 110 | 60 | 50 |
| resistance value retentivity (%) | 5.7 | 2.5 | 2.0 | 0.6 | 0.5 | 0.3 | 0.3 | 0.4 | 20 |

*3: NR/BR = 6/4

EXAMPLE 4

Pressure-sensitive conductive rubber sheet was produced by selecting the rubber, the carbon black and inorganic filler to be most preferable as apparent from the above-mentioned Example 3, and the resistance values at no load time after repetitive operations and the resistance value at pressures of 0.5 kg/cm$^2$ were obtained. The results are listed in Table 4.

From the results, even if the materials were the same as the inorganic filler, the whisker was effective in that the variation in the electric resistance value when pressurized was large. Thus, a pressure-sensitive conductive rubber sheet having large variation in the electric resistance value when pressurized and high response to the sensitive variation in the resistance can be provided.

The inorganic filler of the above-mentioned whisker is partly exposed on the surface of the rubber matrix, and dispersed and buried in the rubber matrix therein. Thus, the filler exposed on the surface at no load time is in contact with the electrode plates. Since the electrode plates do not come in complete contact with the rubber matrix and the electric resistance value of the rubber sheet increases. When the pressure-sensitive conductive rubber sheet is pressed, the filler exposed on the surface on the rubber matrix gradually comes in contact with the electrode plates. When the pressing force increases, the probability of forming a link further increases due to the contact with the conductive member, thereby reducing the resistance value.

As described above, the pressure-sensitive conductive rubber sheet of this invention mixes inorganic filler selected from short fiber, powder and whisker in the rubber matrix together with the carbon black, and partly exposes the filler on the surface of the rubber matrix, thereby greatly reducing the resistance value when force is applied, and improving the sensitivity of the varying resistance value in response to the variation in the pressing force.

TABLE 4

(Unit: parts by weight)

| | Example | | | |
|---|---|---|---|---|
| | 4-1 | 4-2 | 4-3 | 4-4 |
| NR/BR | 100 | 100 | 100 | 100 |
| Z$_n$O | 4 | 4 | 4 | 4 |
| Stearic acid | 1 | 1 | 1 | 1 |
| Process oil | 4 | 4 | 4 | 4 |
| Accelerator CM | 1 | 1 | 1 | 1 |
| Sulfur | 1 | 1 | 1 | 1 |
| Acetylene black | 54 | 54 | 54 | 54 |
| Powder SiC | 5 | | 40 | |
| Powder Si$_3$N$_4$ | | 40 | | |
| Whisker SiC | | 5 | | 40 |
| Repetition (ohm) | | | | |
| 0 | 5k | 70k | 1k | 1.2k |
| 0.5 kg/cm$^2$ | 60 | 60 | 20 | 1.2 |
| Resistance value retentivity (%) | 0.12 | 0.085 | 2.0 | 1.0 |

EXAMPLE 5

(Effect of varying amount of whisker)

After rubber mixture was kneaded in a Banbary mixer according to the mixture shown in Table 5, the mixture was extruded by rolls into 2 mm thick sheets. The sheets were engaged in a mold, and vulcanized by pressing at 150° for 20 minutes. The sheets thus obtained were cut to approx. 10 cm$^2$ as test pieces. A predetermined load was applied to the pieces to measure the relationship between the pressing force and the resistance value of the sheets. The results are shown in FIG. 3.

The measurements of the electric resistance values were first conducted by engaging the test piece between 0.3 mm thick stainless steel plates and 100 g electrode plates, and then applying 6V of constant voltage to obtain the resistance value by a digital multimeter.

When a pressing force of 10 g/cm$^2$ or larger was applied, a Teflon plate and a weight were placed on the electrode plates.

Figure 3:
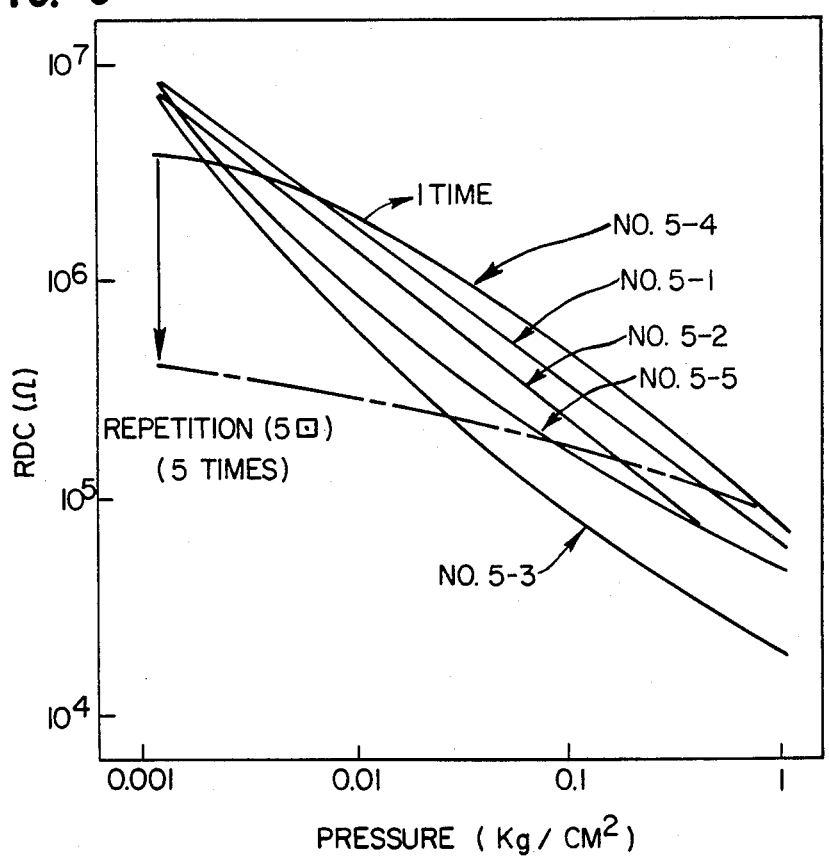
FIG. 3 is a graphical diagram showing the relationship between the pressing force and the resistance value of the conductive rubber material of example 5 in which the whisker is varied in content.

FIG. 3 shows the relationship between the pressing force and the resistance value by the variable amounts of the whisker constantly with respect to 30 parts by weight of carbon black. If the whisker was not added, the difference of the resistance value between the pressing forces 1 g/cm$^2$ and 1000 g/cm$^2$ was small, and if the repetition number of pressing was increased to 5 times, the resistance value decreases to exhibit a resistance value curve having a smooth slope. On the other hand, when using 80 parts by weight, a larger resistance value is obtained than when using 40 parts by weight, and the adding effect of the whisker is obviated. However, if the whisker is added, even if the pressing was repeated five times, the resistance value is stable. The rubber material with the whisker added exhibits the results after five repetitions.

From the above results, the adding amount of the whisker is preferably 10 to 40 parts by weight.

TABLE 5

(Unit: parts by weight)

| | Example | | | C. Example | |
|---|---|---|---|---|---|
| | 5-1 | 5-2 | 5-3 | 5-4 | 5-5 |
| Natural rubber | 100 | 100 | 100 | 100 | 100 |
| Z$_n$O | 4 | 4 | 4 | 4 | 4 |

TABLE 5-continued (Unit: parts by weight)

|  | Example | | | C. Example | |
|---|---|---|---|---|---|
|  | 5-1 | 5-2 | 5-3 | 5-4 | 5-5 |
| Stearic acid | 1 | 1 | 1 | 1 | 1 |
| Accelerator CM | 4 | 4 | 4 | 4 | 4 |
| Sulfur | 1 | 1 | 1 | 1 | 1 |
| Acetylene black | 30 | 30 | 30 | 30 | 30 |
| Whisker SiC | 10 | 20 | 40 | 0 | 80 |

EXAMPLE 6

(Effect of varying amount of carbon black)

Figure 4:
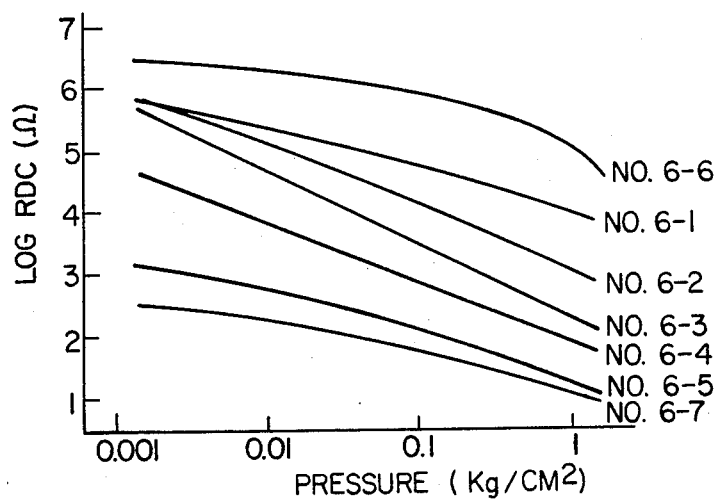
FIG. 4 is a graphical diagram showing the relationship between the pressing force and the resistance value of the conductive rubber material of example 6 in which carbon black is varied in content.

As shown in Table 6, the amount of the whisker was fixed to 20 parts by weight, and the amounts of the carbon black were varied. Test pieces were produced in the same manner as the previous examples, and the relationship between the pressing force and the resistance value of the sheet was measured. The results are shown in FIG. 4.

From the above, the relationship between log P and log R with 30 to 70 parts by weight of the carbon black is linear, and as the pressing force increases, the resistance value gradually increases, and the varying range of the resistance value becomes large

TABLE 6

(Unit: parts by weight)

|  | Example | | | C. Example | | | |
|---|---|---|---|---|---|---|---|
|  | 6-1 | 6-2 | 6-3 | 6-4 | 6-5 | 6-6 | 6-7 |
| Natural rubber | 100 | 100 | 100 | 100 | 100 | 100 | 100 |
| $Z_nO$ | 4 | 4 | 4 | 4 | 4 | 4 | 4 |
| Stearic acid | 1 | 1 | 1 | 1 | 1 | 1 | 1 |
| Accelerator CM | 4 | 4 | 4 | 4 | 4 | 4 | 4 |
| Sulfur | 1 | 1 | 1 | 1 | 1 | 1 | 1 |
| Acetylene black | 30 | 40 | 50 | 60 | 70 | 20 | 80 |
| Whisker SiC | 20 | 20 | 20 | 20 | 20 | 20 | 20 |

EXAMPLE 7

Test pieces having approximately 2 mm thick were produced in the same manner as the previous Examples by the mixture listed in Table 7, the relationship between the compressing distortion and the voltage of the sheets, and the fatigue resistance and creep resistance were measured.

In this Example, a method of measuring the relationship between the compressing distortion and the voltage included holding the sheet by the electrode plates, flowing a current of 5 microamperes therein, then mounting it in a load cell type compression tester and the voltage value was measured at pressing speed of 0.5 mm/sec. by a digital multimeter.

A method of measuring the fatigue resistance due to repetitive pressing included repetitively applying pressure of 0.5 kg/cm² 100,000 to 8,000,000 times at a rate of 25 times per second to the sheet, measuring the electric resistance value, and dividing it by the electric resistance value under pressure of 0.5 kg/cm² before the repetitive pressing.

Figure 5:
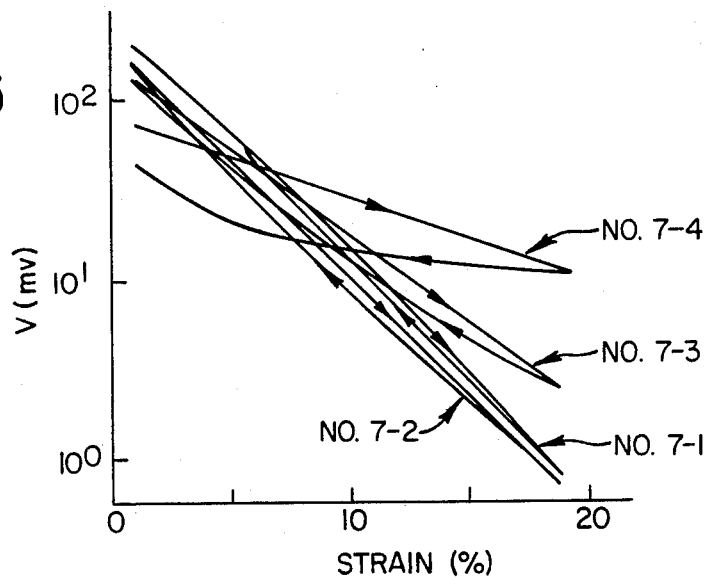
FIG. 5 is a graphical diagram showing the relationship between the compression distortion and the voltage of the example 7 of the invention and comparison example.
Figure 6:
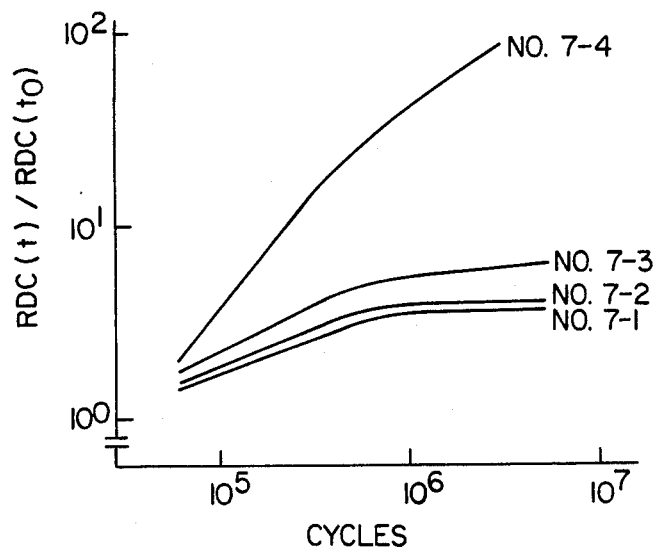
FIG. 6 is a graphical diagram showing the relationship between the resistance value retention when subject to repetitive pressing force, example 7 of the invention, and the comparison example.
Figure 7:
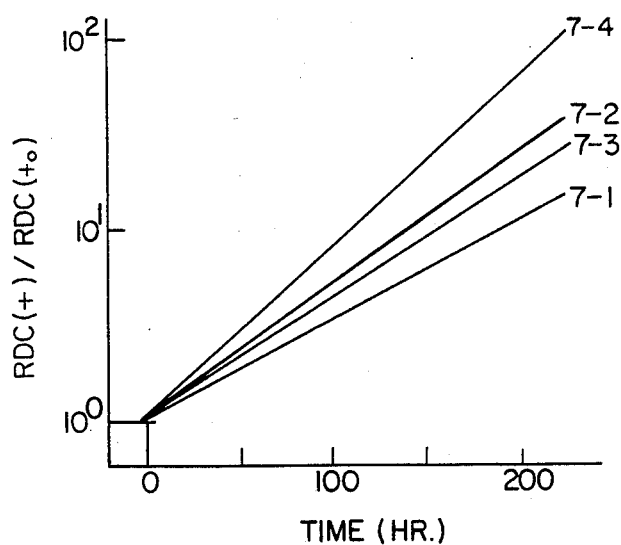
FIG. 7 is a graphical diagram showing creep characteristic of the conductive rubber material of the example 7 of the invention and the comparison example.

Further, a method of measuring the creep resistance included applying a load of 0.5 kg/cm² to the sheet, and obtaining the value produced by dividing the resistance value at creep applying time by the resistance value at creep time being 0. The results are shown in FIGS. 5 to 7.

From the results, the pressure-sensitive conductive rubber material of this invention linearly varies the voltage according to the magnitude of the compressing distortion, and is substantially linearly displaced even when the load was removed. Thus, its hysteresis is small, the resistance value after repetitive deformation is small, and the creep resistance is excellent.

According to this invention, as described above, the pressure-sensitive conductive rubber material includes the conductive members of the carbon black and the whisker mixed in the amounts of predetermined ranges. Thus, the pressing force and the resistance value exhibit linearly analog variation so that the resistance value gradually varies with respect to the pressing force, and the relationship between the compressing distortion and the voltage similarly varies. Therefore, the characteristics can be not only quantitatively obtained, but also the hysteresis is small, the variation in the resistance value after repetitive deformations is small, and the creep resistance is excellent, thereby providing high reliability as a pressure-sensitive sensor.

TABLE 7

|  | Example | | C. Example | |
|---|---|---|---|---|
|  | 7-1 | 7-2 | 7-3 | 7-4 |
| NR | 100 |  | 100 |  |
| NBR |  | 100 |  | 100 |
| $Z_nO$ | 4 | 4 | 4 | 4 |
| Stearic acid | 1 | 1 | 1 | 1 |
| Accelerator CM | 4 | 4 | 4 | 4 |
| Sulfur | 1 | 2 | 1 | 1 |
| Acetylene black | 50 | 50 | 40 | 50 |
| Whisker SiC | 20 | 20 | 20 | 0 |
| Powder SiC | 0 | 0 | 10 | 20 |

EXAMPLE 8

After rubber mixtures were kneaded by a Banbary mixer according to the mixture shown in Table 8, it was extruded to sheets 2 mm thick, by rolls. After glass powder having electric insulation shown in Table 5 was wiped on both side surfaces of the sheet, the sheets were engaged therebetween and the sheets were vulcanized by pressing at 150° C. for 20 minutes. The obtained sheets were cut to 30×33 mm to form test pieces. Then, the initial electric resistance values when nonpressurized (however, a Teflon plate of 100 g was placed on the test piece) or when pressurized. After the sheets were pressed 10 times under the pressing conditions of 0.5 kg/cm², the electric resistance values when nonpressurized and pressurized at 0.5 kg/cm² were measured. The resistance value retentivity (%) at 10 times repetitive pressing times was the value determined by dividing the resistance value which pressurized by that when nonpressurized.

Figure 8:
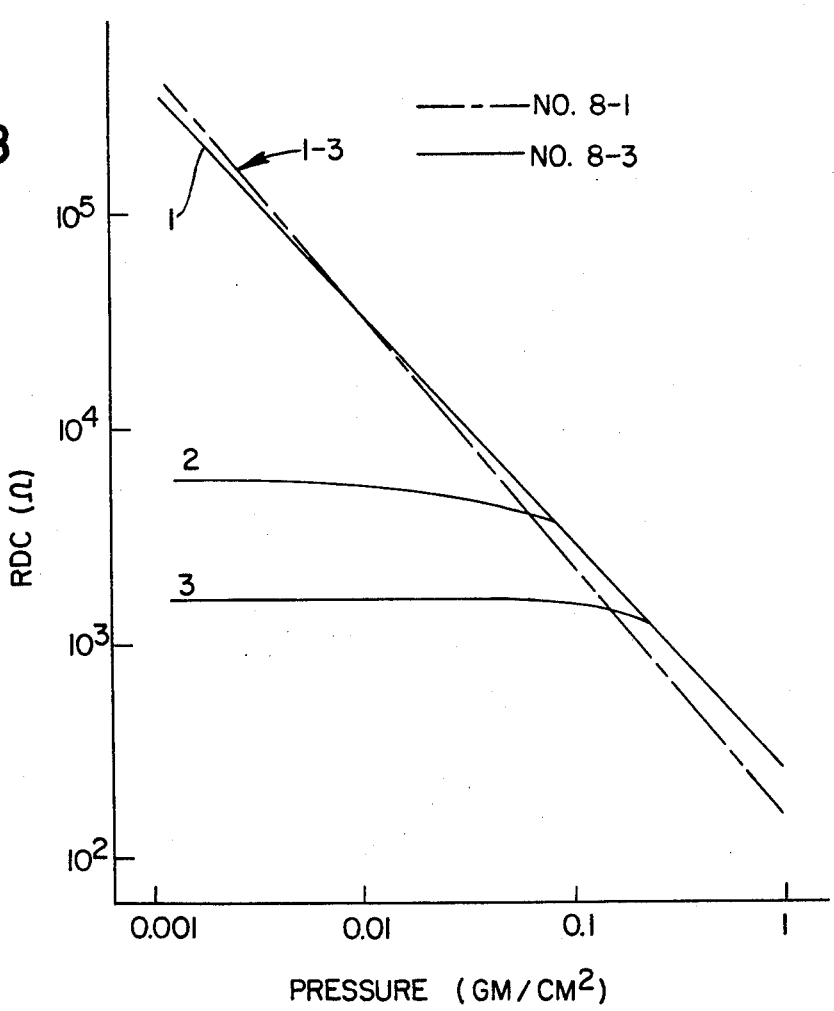
FIG. 8 is a graphical diagram showing first to third varying curves obtained by plotting the variation of electric resistance value upon pressing of the rubber sheet of the example 8 of the invention and the comparison example.

In order to measure the degree of variations in the electric resistance value, a large load was gradually applied discontinuously for 5 to 15 sec. to the test pieces. The electric resistance values at that time were measured to obtain the varying curve of the first electric resistance value with respect to the pressing, and further the load was then removed. Loads were applied again for of 5 to 15 sec., and second and third electric resistance values were obtained. The results are shown in FIG. 8.

Further, in order to measure the creep resistance of the rubber sheet, a load of 0.5 kg/cm² was applied to the sheet to obtain the variation in the resistance value at creep applying time. The results are shown in Table 9.

From the results, the conductive rubber sheet in which the glass powder was buried on the surface of the rubber sheet mixed with the carbon black and the whisker exhibits high resistance value when nonpressurized as compared with that in which the glass powder was not buried on the surface. The variation in the resistance value when pressurized was large with good sensitivity, the variation in the resistance value with respect to the repetitive pressing became small, the hysteresis of the electric resistance value became small, and the creep resistance is excellent.

According to this invention as described above, the pressure-sensitive conductive rubber sheet is produced by burying glass powder having electric insulation on both or one side surface of the sheet obtained by mixing the inorganic filler selected from the short fiber, powder and the whisker in the rubber matrix together with the carbon black, thereby maintaining the insulating state with the electric resistance value when nonpressurized, while largely decreasing the electric resistance value in one pressurized and providing large variation in the resistance value to provide good sensitivity, and further providing small variation in the electric resistance value even if applying the repetitive pressing to the sheet to provide good fatigue resistance and creep resistance with long lifetime.

TABLE 8

| | (Unit: parts by weight) | | | |
|---|---|---|---|---|
| | Example | | C. Example | |
| | 8-1 | 8-2 | 8-3 | 8-4 |
| NR | 100 | 100 | 100 | 100 |
| $Z_nO$ | 4 | 4 | 4 | 4 |
| Stearic acid | 1 | 1 | 1 | 1 |
| Process oil | 4 | 4 | 4 | 4 |
| Accelerator CM | 1 | 1 | 1 | 1 |
| Sulfur | 1 | 1 | 1 | 1 |
| Acetylene black | 50 | 50 | 50 | 50 |
| Whisker SiC *1 | 20 | 20 | 0 | 0 |
| Glass powder *1 | 2.3 | 1.4 | none | none |

*1: % by weight

TABLE 9

| | Example | | C. Example | |
|---|---|---|---|---|
| | 8-1 | 8-2 | 8-3 | 8-4 |
| 10 times repetition (ohm) | | | | |

TABLE 9-continued

| | Example | | C. Example | |
|---|---|---|---|---|
| | 8-1 | 8-2 | 8-3 | 8-4 |
| 0 | 80k | 100k | 8k | 250 |
| 0.5 kg/cm$^2$ | 0.15 | 0.14 | 1 | 20 |
| Creep resistance *2 | | | | |
| 1 hr(ohm) | 0.95 | 0.9 | 1 | 1.5 |
| 60 hrs | 0.9 | 0.9 | 4 | 8 |
| 200 hrs | 0.9 | 0.9 | 15 | 150 |

*2: value obtained by dividing the resistance value (Rf) at creeping time by resistance value ($R_o$) before creeping.

EXAMPLE 9

After rubber mixture was kneaded by a Banbary mixer according to the mixture shown in Table 10, the kneaded rubber was dissolved in a solvent as rubber paste. The paste was then coated on a flat aluminum plate to form a film, then filled in an oven, and vulcanized at 150° C. for 20 min. The thin film having 80 micron of thickness obtained in this manner was cut to 30×33 mm to form test pieces. The test pieces were then measured for electric resistance values when nonpressurized (however, an electrode plate having 12 g was mounted on the test piece) or when pressurized. The results are also shown in Table 10.

From the results, the rubber sheet mixed with the whisker has excellent pressure sensitive conductivity as compared with that mixed with powder even if the same materials are used.

TABLE 10

| | (Unit: parts by weight) | | | | | | | | | | |
|---|---|---|---|---|---|---|---|---|---|---|---|
| | Example | | | | | | C. Example | | | | |
| | 9-1 | 9-2 | 9-3 | 9-4 | 9-5 | 9-6 | 9-7 | 9-8 | 9-9 | 9-10 | 9-11 |
| NR | 100 | | | 100 | | | 100 | 100 | | | |
| NBR | | 100 | | | | | | | 100 | | |
| CR | | | 100 | | | | | | | | |
| Silicone rubber | | | | | | 100 | | | | | 100 |
| SBS | | | | | 100 | | | | | | |
| $Z_nO$ | 5 | 5 | 5 | 5 | | | 5 | 5 | 5 | 100 | |
| Stearic acid | 4 | 1 | 2 | 4 | | | 4 | 4 | 1 | | |
| Process oil | | | | | | | | | | | |
| Accelerator CM | 1 | 1 | | 1 | | | 1 | 1 | 1 | | |
| Accelerator 22 | | | 0.5 | | | | | | | | |
| MgO | | | | 4 | | 3 | | | | | 3 |
| Acrylic acid ester | | | | | | 3 | | | | | 3 |
| Peroxide | | | | | | 1 | | | | | 1 |
| Sulfur | 2 | 2 | | 2 | | | 2 | 2 | 2 | | |
| Whisker SiC | 80 | 80 | 80 | 40 | 20 | 40 | | | | | |
| Powder SiC | | | | | | | 80 | | 80 | | |
| Nonpressing time | ∞ | ∞ | ∞ | ∞ | ∞ | ∞ | ∞ | ∞ | ∞ | ∞ | ∞ |
| 10 g/cm$^2$ | 40k | ∞ | ∞ | 4M | ∞ | ∞ | ∞ | ∞ | ∞ | ∞ | ∞ |
| 500 | 7k | 10M | 80 | 1M | 50 | 30 | ∞ | ∞ | ∞ | ∞ | ∞ |
| 1 kg/cm$^2$ | 2k | 1M | 330 | 100k | 15 | 20 | ∞ | ∞ | ∞ | ∞ | ∞ |
| 2 | 270 | 50 | 28 | | | | ∞ | ∞ | ∞ | ∞ | ∞ |
| Film thickness (micron) | 80 | 140 | 160 | 100 | 90 | 100 | 80 | 80 | 140 | 100 | 100 |

EXAMPLE 10

The thickness of the rubber sheets having the mixtures in the Examples 9 (Nos. 9-1, 3, 4, 5 and 6) were varied from approx. 20 micron to 400 micron. The electric resistance values of the obtained rubber sheets were measured when nonpressurized and when pressurized.

The results are shown in Table 11. Thus, if the thickness of the rubber sheet exceeds 180 micron, the property of the pressure-sensitive conductivity is erased.

According to this invention as described above, the whisker of acicular crystal is mixed and dispersed in the rubber, and the thickness is 200 micron or smaller. Thus, since no conductive material such as carbon black is mixed as conventional, a substantially completely insulting state can be held when nonpressurized, while the electric resistance value can be gradually decreased when pressurized to perform the pressure-sensitive conductivity. Since the thickness is small, a conductive thin film can be directly formed on the electrode plate to produce a switch having small stroke.

the test piece). The result is shown in Table 13, and when the rubber matrix and the natural rubber were used, the stable pressure-sensitive rubber molding having small electric capacity increasing ratio was obtained.

Further, in order to measure the degree of variations in the electric resistance, a large load was gradually

TABLE 11

| (Electric resistance value) | | | | | | | | | | |
|---|---|---|---|---|---|---|---|---|---|---|
| | Example 9-1 (NR) | | | | | Example 9-3 (CR) | | | | |
| Film thickness (micron) | 20 | 60 | 100 | 150 | 200 | 20 | 100 | 160 | 220 | 400 |
| Nonpressing time | ∞ | ∞ | ∞ | ∞ | ∞ | 10k | 50k | ∞ | ∞ | ∞ |
| 10 g/cm$^2$ | 10M | ∞ | ∞ | ∞ | ∞ | 1k | 4k | 4k | ∞ | ∞ |
| 0.5 | | 60 | 50k | 1M | 800k | ∞ | 5 | 20 | 15 | ∞ | ∞ |
| 1 kg/cm$^2$ | | 30 | 350 | 100k | 500k | ∞ | 5 | 15 | 10 | ∞ | ∞ |
| Film thickness | Example 9-4 (NR) | | | | Example 9-5 (SBS) | | | Example 9-6 (Silicon) | | |
| (micron) | 20 | 100 | 150 | 170 | 90 | 250 | 300 | 40 | 60 | 100 | 120 | 1270 |
| Nonpressing time | ∞ | ∞ | ∞ | ∞ | ∞ | ∞ | ∞ | ∞ | ∞ | ∞ | ∞ | ∞ |
| 10 g/cm$^2$ | 10M | ∞ | ∞ | ∞ | 4M | ∞ | ∞ | 70k | 70k | ∞ | ∞ | ∞ |
| 0.5 | 30 | 1M | 800k | ∞ | 50 | ∞ | ∞ | 30 | 10 | 30 | 25k | 40k |
| 1 kg/cm$^2$ | 10 | 100k | 500k | ∞ | 15 | ∞ | ∞ | 15 | 7 | 20 | 15k | 5k |

EXAMPLE 11

After the rubber mixture was kneaded by a Banbary mixer according to the mixture in Table 12, the mixture was extruded by rolls to sheets 2 mm thick. The sheets were held by a mold and vulcanized by pressing at 150° C. and 20 min. The obtained sheets were cut into 30×33 mm to form test pieces. The test pieces were pressed, and the electric resistance value and the electric capacity at that time were measured.

The electric resistance value (RAC) was measured by holding the test piece between Teflon plates of approx. 100 g by mounting a 0.3 mm thick copper plate between the test piece and the Teflon plate. The resistance is measured with the pair of the copper plates as electrode plates by an LCR meter. The resistance value at that time was the value with AC (100 kHz). The pressing was conducted by mounting a weight on the Teflon plate disposed at its upper side.

The electric capacity (C) was measured by the same LCR meter as the electric resistance value.

Figure 9:
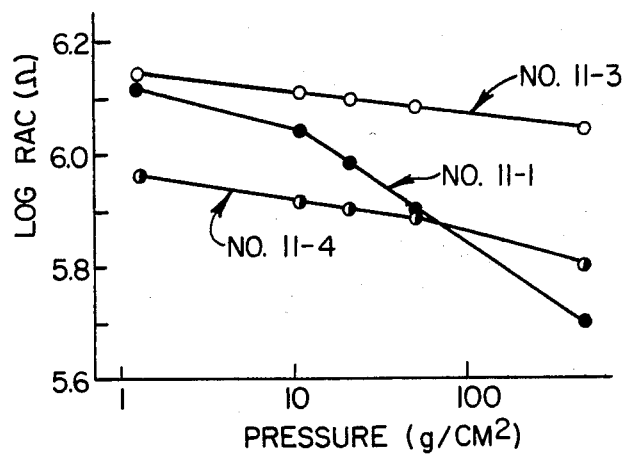
FIG. 9 is a graph showing resistance values plotted with respect to the pressing force of the rubber material of example 11 of the invention and comparison examples.
Figure 10:
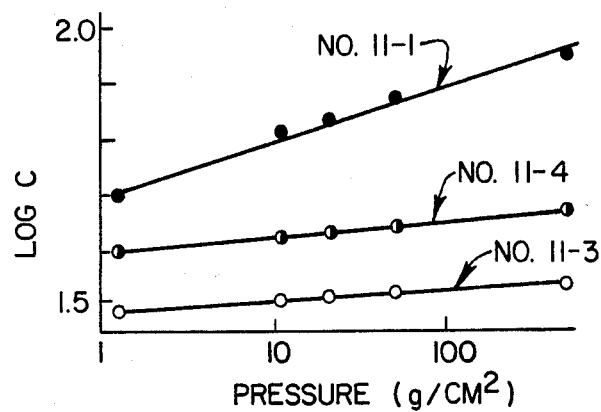
FIG. 10 is a graph showing electric capacity plotted with respect to a pressing force of the rubber material of example 11 of the invention and comparison examples.

These results are shown in FIGS. 9 and 10.

Thus, the rubber sheet which used the whisker as compared with the powder of the same silicon carbide exhibited larger variations in the electric resistance values and the electric capacity value with respect to pressing.

TABLE 12

| (Unit: parts by weight) | | | | |
|---|---|---|---|---|
| | Example | | C. Example | |
| | 11-1 | 11-2 | 11-3 | 11-4 |
| CR | 100 | | 100 | 100 |
| NR | | 100 | | |
| Z$_n$O | 5 | 5 | 5 | 5 |
| Stearic acid | 2 | 2 | 2 | 2 |
| Accelerator CM | 0.5 | 1.5 | 0.5 | 0.5 |
| Sulfur | 0 | 2.0 | 0 | 0 |
| Whisker SiC | 80 | 80 | 0 | 0 |
| Powder SiC | 0 | 0 | 0 | 80 |

Further, after the test piece was repetitively pressed under the pressurizing condition of 0.5 kg/cm$^2$ at predetermined times, the value was determined by dividing the electric capacity $C_{0.5}$ when pressurized at 0.5 kg/cm$^2$ by the electric capacity Co when nonpressurized (however, the Teflon plate of 100 g was placed on applied discontinuously to the test piece, the electric resistance value at that time was measured, thereby obtaining the varying curve of the first electric resistance value with respect to the pressing. Further, the load was then removed, various loads were again applied, and the varying curves of the second and third electric resistance values were obtained. The varying curve of fourth electric resistance value became the stable state substantially the same as the third one. Thus, the difference of the variation in the varying curve of the electric resistance value with respect to the first and third extrusions was evaluated by the area S.

Figure 11:
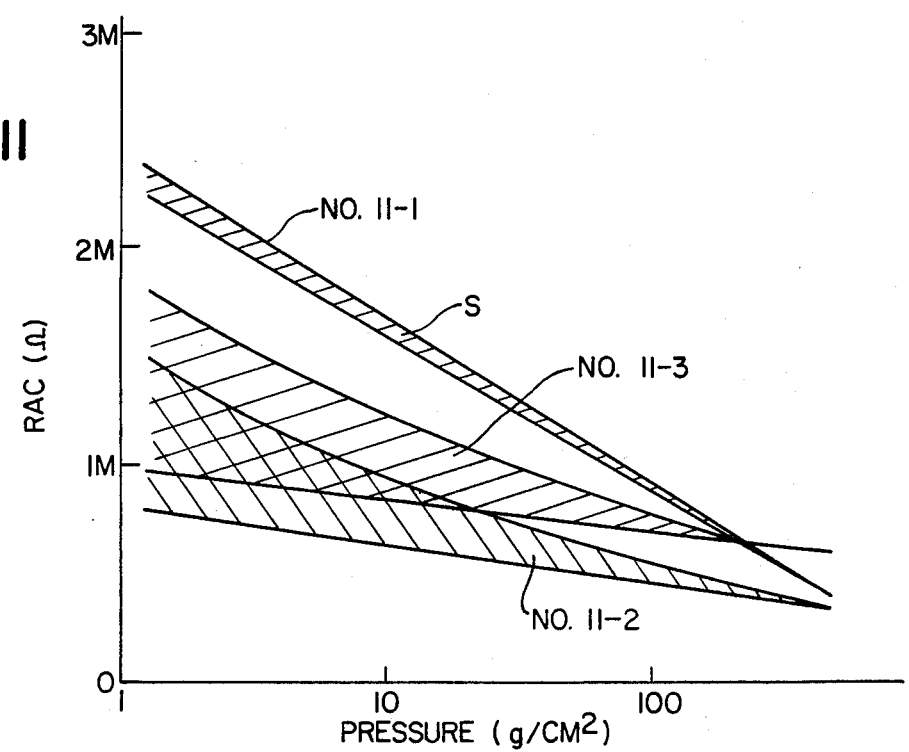
FIG. 11 is a graph showing the degrees of variations of varying curves of electric resistance values with respect to the first and third pressings obtained by plotting the variations of the electric resistance value with respect to the pressing force of the pressure-sensitive conductive rubber material of the example 11 of the invention and the comparison example.

The results are shown in FIG. 11. According to this, the pressure-sensitive rubber molding mixed with the whisker of this invention reduces the area S as compared with the molding mixed with the powder or sole rubber, and also decreases the variation in the resistance value with respect to the repetitive pressing, and the small hysteresis of the electric resistance value was eventually obtained.

TABLE 13

| (Electric capacity increase ratio: $C_{0.5}$/Co) | | |
|---|---|---|
| Repetition | Example 11-1 | Example 11-2 |
| 1 | 4.1 | 2.4 |
| 2 | 3.1 | 2.3 |
| 3 | 2.9 | 2.3 |
| 4 | 2.5 | 2.3 |
| 5 | 1.5 | 2.3 |

EXAMPLE 12

The amounts of the whisker of the mixture in the sample No. 11-1 of the previous Example 4 were varied to 50, 80, 100 and 200 parts by weight, and test pieces made of vulcanized sheet 3 mm thick were produced in the same method as that in the previous Example. A large load was applied gradually discontinuously to the test pieces to 0.5 kg/cm$^2$ maximum, the load was then removed, and further the load of 0.5 kg/cm$^2$ was again applied. After this operation was repeated five times, the electric capacity increasing ratio of the capacity $C_{0.5}$ when pressurized at 0.5 kg/cm$^2$ divided by the electric capacity Co at no load (however, the Teflon plate of 100 g. was placed on the test piece) was obtained. Further, the electric resistance value, when pressurized, of the test piece was obtained.

The results are shown in Table 14. According to the table, the more the amount of the whisker increases, the better pressure sensitive rubber molding can be obtained.

According to this invention as described above, the pressure-sensitive rubber molding is formed from a composition mixed with inorganic filler made of the whisker in the rubber. Conductive member such as carbon black is not mixed in the composition. The rubber can sensitively senses the variations in the electric resistance value and the electric capacity with respect to the pressuring variation, and stable resistance values can be produced with respect to repetitive pressing and the pressure-sensitive rubber exhibits small hysteresis.

TABLE 14

| | Amount of whisker (by weight) | | | |
|---|---|---|---|---|
| | 50 | 80 | 100 | 200 |
| Electric capacity increasing ratio $C_{0.5}/C_0$ | 1.3 | 2.5 | 2.9 | 5.2 |
| Resistance value reduction ratio $RAC_{0.5}/RAC_0$ (%) | 70.0 | 24.2 | 17.4 | 7.5 |

(These results are shown in FIGS. 9 and 10.)

We claim:

1. An electrically conductive rubber material having pressure-responsive variable electrical resistance, said material comprising:
   a matrix formed of an electrically insulative rubber;
   carbon black distributed in said matrix; and
   an inorganic filler distributed in said matrix consisting of semiconductive acicular ceramic whiskers selected from the group consisting of alpha-silicon carbide, beta-silicon carbide, alpha-alumina, titanium oxide, tin oxide, graphite, Fe, and Ni having a diameter of 0.05 to 3 microns, and a length of 5 to 500 microns, 30 to 70 parts by weight of carbon black and 10 to 60 parts by weight of whiskers being provided in 100 parts by weight of said rubber, and the total amount of the carbon black and the whiskers being 40 to 90 parts by weight in 100 parts of said rubber.

2. The variable resistance rubber material of claim 1 wherein said inorganic filler is exposed at a surface of said matrix.

3. An electrically conductive rubber material having pressure-responsive variable electrical resistance, said material comprising:
   a matrix formed of an electrically insulative rubber;
   carbon black distributed in said matrix;
   an inorganic filler distributed in said matrix consisting of semiconductive acicular ceramic whiskers selected from the group consisting of alpha-silicon carbide, beta-silicon carbide, alpha-alumina, titanium oxide, tin oxide, graphite, Fe, and Ni having a diameter of 0.05 to 3 microns, and a length of 5 to 500 microns, 30 to 70 parts by weight of carbon black and 10 to 60 parts by weight of whiskers being provided in 100 parts by weight of said rubber, and the total amount of the carbon black and the whiskers being 40 to 90 parts by weight in 100 parts of said rubber; and
   electrically insulating powder having a particle size of 0.1 to 100 microns in at least one surface portion of said matrix, said powder being present in the amount of 0.05 to 5% by weight of said material at said surface portion.

4. The variable resistance rubber material of claim 3 wherein said powder on said surface is one or more powders selected from the group consisting of glass, calcium carbonate, clay, talc, phenyl resin, epoxy resin, urea resin, and ebonite.

5. An electrically conductive rubber material having pressure-responsive variable electrical resistance, said material comprising:
   a matrix formed of an electrically insulative rubber;
   carbon black dispersed in said matrix; and
   a filler of semiconductive acicular ceramic whiskers dispersed in said rubber material selected from the group consisting of alpha-silicon carbide, beta-silicon carbide, alpha-alumina, titanium oxide, tin oxide, graphite, Fe, and Ni having a diameter of 0.05 to 3 microns, and a length of 5 to 500 microns, 30 to 70 parts by weight of carbon black and 10 to 60 parts by weight of whiskers being provided in 100 parts by weight of said rubber and the total amount of the carbon black and the whiskers being 40 to 90 parts by weight in 100 parts of said rubber.

6. The variable resistance rubber material of claim 5 wherein said material has a thickness of up to 200 microns.

7. The variable resistance rubber material of claim 5 wherein an insulative surface portion is provided in said matrix.

8. The variable resistance rubber material of claim 5 wherein an insulative surface portion is provided in said matrix, said insulative surface face portion having insulative powder dispersed therein.

9. The variable resistance rubber material of claim 5 wherein an insulative surface portion is provided in said matrix, said insulative surface portion having up to 5% by weight of insulative powder dispersed therein.

* * * * *